US005590122A

United States Patent [19]

Sandorfi et al.

[11] Patent Number: 5,590,122
[45] Date of Patent: Dec. 31, 1996

[54] METHOD AND APPARATUS FOR REORDERING FRAMES

[75] Inventors: Miklos A. Sandorfi, Foxboro; Moshe M. Shriki, Sharon, both of Mass.

[73] Assignee: EMC Corporation, Hopkinton, Mass.

[21] Appl. No.: 363,392

[22] Filed: Dec. 22, 1994

[51] Int. Cl.⁶ .................................................. H04L 12/56
[52] U.S. Cl. .................................................. 370/394
[58] Field of Search .......................... 370/60, 60.1, 94.1, 370/94.2, 85.13, 85.15, 84, 82, 61, 110.1, 114.3, 56, 58.3, 58.1, 58.2, 63, 64–65.5, 105.1; 395/325, 400, 425, 700, 600, 250, 650, 280, 427, 401, 842, 200.01; 364/200, 222.81

[56] References Cited

U.S. PATENT DOCUMENTS

| Re. 31,182 | 3/1983 | Crager et al. | 178/3 |
|---|---|---|---|
| Re. 32,900 | 4/1989 | Orsic | 370/54 |
| 4,475,192 | 10/1984 | Fernow et al. | 370/9.1 |
| 4,630,260 | 12/1986 | Toy et al. | 370/60 |
| 4,703,475 | 10/1987 | Dretzka et al. | 370/60 |
| 4,703,478 | 10/1987 | Haselton et al. | 370/94.1 |
| 4,707,831 | 11/1987 | Weir et al. | 370/94.1 |
| 4,710,916 | 12/1987 | Amstutz et al. | 370/58 |
| 4,751,697 | 6/1988 | Hunter et al. | 370/60 |
| 4,769,811 | 9/1988 | Eckberg, Jr. et al. | 370/60 |
| 4,780,870 | 10/1988 | McHarg et al. | 370/60 |
| 4,792,948 | 12/1988 | Hangen et al. | 370/95.1 |
| 4,794,589 | 12/1988 | Finch et al. | 370/60 |
| 4,797,880 | 1/1989 | Bussey, Jr. et al. | 370/60 |
| 4,866,701 | 9/1989 | Giacopelli et al. | 370/60 |
| 4,872,159 | 10/1989 | Hemmady et al. | 370/60 |
| 4,893,302 | 1/1990 | Hemmady et al. | 370/60 |
| 4,893,304 | 1/1990 | Giacopelli et al. | 370/60 |
| 4,899,333 | 2/1990 | Roediger | 370/60 |
| 4,905,233 | 2/1990 | Cain et al. | 370/94.1 |
| 4,926,416 | 5/1990 | Weik | 370/60.1 |
| 4,951,278 | 8/1990 | Biber et al. | 370/60 |
| 5,008,878 | 4/1991 | Ahmadi et al. | 370/60 |
| 5,014,265 | 5/1991 | Hahne et al. | 370/60 |
| 5,084,870 | 1/1992 | Hutchinson et al. | 370/94.1 |
| 5,113,392 | 5/1992 | Takiyasu et al. | 370/85.15 |
| 5,113,499 | 5/1992 | Ankney et al. | 395/325 |
| 5,115,432 | 5/1992 | Haas | 370/94.1 |
| 5,127,000 | 6/1992 | Henrion | 370/60 |
| 5,144,622 | 9/1992 | Takiyasu et al. | 370/85.13 |
| 5,148,272 | 9/1992 | Acampora et al. | |
| 5,151,899 | 9/1992 | Thomas et al. | 370/94.1 |
| 5,164,937 | 11/1992 | Tanabe et al. | 370/60 |
| 5,179,556 | 1/1993 | Turner | 370/94.1 |
| 5,214,642 | 5/1993 | Kunimoto et al. | 370/82 |
| 5,220,562 | 6/1993 | Takada et al. | 370/85.13 |
| 5,224,095 | 6/1993 | Woest et al. | 370/85.13 |
| 5,235,595 | 8/1993 | O'Dowd | 370/94.1 |

(List continued on next page.)

OTHER PUBLICATIONS

Fiber Channel, Physical and signaling interface (FC–PH), Working draft proposed American National Standard for Information Systems, Computer and Business Equipment Manufacturers Association, Jun. 1, 1994, pp. 1–388.

Primary Examiner—Douglas W. Olms
Assistant Examiner—Dang Ton
Attorney, Agent, or Firm—Weingarten, Schurgin, Gagnebin & Hayes LLP

[57] ABSTRACT

A method and apparatus for reordering frames of a packet received at a node in an order other than the order in which the frames were transmitted. The node includes a port having a frame manager for providing an entry in memory for each frame received non-consecutively with respect to a previously received frame. A list of memory entries associated with a given packet provides a reassembly table. In one embodiment, each memory entry includes a sequence count identifying the previously received frame, a pointer to a memory location at which data associated with a set of one or more prior consecutively received frames are stored, and a data length value corresponding to a length of data associated with the set of prior consecutively received frames. The frames of the packet are reordered by processing entries in the reassembly table in ascending sequence count order.

18 Claims, 13 Drawing Sheets

U.S. PATENT DOCUMENTS

| | | | |
|---|---|---|---|
| 5,260,935 | 11/1993 | Turner | 370/60 |
| 5,274,642 | 12/1993 | Widjaja et al. | 370/94.1 |
| 5,280,476 | 1/1994 | Kojima et al. | 370/60.1 |
| 5,287,346 | 2/1994 | Bianchini, Jr. et al. | 370/60 |
| 5,337,313 | 8/1994 | Buchholz et al. | 370/94.1 |
| 5,339,311 | 8/1994 | Turner | 370/60 |
| 5,341,369 | 8/1994 | Langer | 370/60 |
| 5,351,239 | 9/1994 | Black et al. | 370/84 |
| 5,361,259 | 11/1994 | Hunt et al. | 370/84 |

| Sequence Count | Data Pointer | Data Length |
|---|---|---|
| 184a ← 182a | 186a | 188a |
| 184b ← 182b | 186b | 188b |
| ... | ... | ... |
| 184n ← 182n | 186n | 188n |

(Table 180)

FIG. 5

| | |
|---|---|
| 250 → 0-127 | |
| 128-255 | Data 56a of frame 50a |
| 256-383 | |
| 252 → 384-511 | |
| 512-639 | Data 56b of frame 50b |
| 254 → 640-767 | |
| 768-895 | |
| 896-1023 | |
| 1024-1151 | |
| 1152-1279 | Data 56f of frame 50f |
| 1280-1407 | |
| 1408-1535 | |
| 1536-1663 | |
| 256 → 1664-1791 | |
| 1792-1919 | |
| 1920-2047 | Data 56c of frame 50c |
| 2048-2175 | |
| 258 → 2176-2303 | |
| 2304-2431 | |
| 2432-2559 | |
| 2560-2687 | |
| 2688-2815 | |
| 2816-2943 | |
| 2944-3071 | |
| 3072-3199 | Data 56d of frame 50d |
| 3200-3327 | |
| 3328-3455 | |
| 3456-3583 | |
| 3584-3711 | |
| 3712-3839 | |
| 3840-3967 | |
| 3968-4095 | |
| 4096-4223 | |
| 260 → 4224-4351 | |
| 262 → 4352-4479 | Data 56e of frame 50e |

FIG. 8

| Sequence Count | Data Pointer | Data Length |
|---|---|---|
| 1 | 250 | 768 |
| 5 | 254 | 1024 |
| 4 | 256 | 2688 |

| Offset | Content |
|---|---|
| 270 → 0-127 | Data 56b of frame 50b |
| 128-255 | |
| 272 → 256-383 | Data 56a of frame 50a |
| 384-511 | |
| 512-639 | |
| 274 → 640-767 | |
| 768-895 | Data 56f of frame 50f |
| 896-1023 | |
| 1024-1151 | |
| 1152-1279 | |
| 1280-1407 | |
| 1408-1535 | |
| 1536-1663 | |
| 276 → 1664-1791 | |
| 1792-1919 | Data 56c of frame 50c |
| 1920-2047 | |
| 2048-2175 | |
| 278 → 2176-2303 | |
| 2304-2431 | Data 56d of frame 50d |
| 2432-2559 | |
| 2560-2687 | |
| 2688-2815 | |
| 2816-2943 | |
| 2944-3071 | |
| 3072-3199 | |
| 3200-3327 | |
| 3328-3455 | |
| 3456-3583 | |
| 3584-3711 | |
| 3712-3839 | |
| 3840-3967 | |
| 3968-4095 | |
| 4096-4223 | |
| 280 → 4224-4351 | |
| 282 → 4352-4479 | Data 56e of frame 50e |

FIG. 10

| Sequence Count | Data Pointer | Data Length |
|---|---|---|
| 1 | 270 | 256 |
| 0 | 272 | 512 |
| 5 | 274 | 1024 |
| 4 | 276 | 2688 |

METHOD AND APPARATUS FOR REORDERING FRAMES

BACKGROUND OF THE INVENTION

This invention relates generally to switch fabrics and more particularly, to apparatus and techniques for reordering frames of a packet received by a node out of the order in which the frames were transmitted.

BACKGROUND OF THE INVENTION

Switch networks, or fabrics, for transmitting packets between two or more nodes are known. Typically, a packet, sometimes referred to alternatively as a sequence, includes multiple frames, with each frame including a header and a payload, such as data. Switch fabrics include a plurality of switches arranged to permit transmission of frames over different paths. One illustrative type of switch fabric is Fibre Channel, in which the nodes connected to the fabric are referred to as N_Ports.

Illustrative nodes include work stations, data storage devices, or arrays, and network interfaces. A network interface node is adapted for connection to a network, such as a local area network, thereby permitting communication between other nodes connected to the switch fabric and nodes connected to the network. Although generally a node is capable of both transmitting and receiving packets, in the transmission of a given packet, the node transmitting the packet is referred to hereinafter as the transmitting, or source node and the node receiving the packet is referred to hereinafter as the receiving, or destination node.

Various techniques are employed for optimizing transmission of frames through a fabric in order to minimize congestion on a particular path and thus, to reduce transmission time. However, such transmission optimization may result in frames of a given packet arriving at the destination node in an order different from the order in which the frames are arranged in the packet prior to transmission.

One technique for reordering frames received at a node out of order is to generate and store a memory entry corresponding to each of the received frames, including a "sequence count" identifying the sequential position of the frame within its associated packet. Once all of the frames of a packet are received, a processor executes a program to sort the memory entries by sequence count. However, since the memory includes as many entries as there are frames in the packet, this technique tends to be inefficient in terms of both memory requirement for storing the entries and processing time for sorting the entries.

SUMMARY OF THE INVENTION

In accordance with the invention, a receive node is provided with a port for reordering frames of a packet received at the port out of order in a manner that requires less memory space and processing time than heretofore required. The port includes a frame manager which receives frames and generates a reassembly table in an associated memory including only entries corresponding to frames received out of sequential order with respect to a previously received frame (and a last entry indicating that the last frame of the respective packet has been received). In one embodiment, each such memory entry includes a sequence count, identifying the previously received frame, a pointer to a location in memory at which data associated with a set of one or more previously, consecutively received frames are stored, and a data length value representing the length of data associated with the set of frames.

The reassembly table entries are processed to reorder the frames of the received packet. More particularly, the port is in communication with a system which includes a processor for processing entries of the reassembly table in ascending sequence count order to reorder the packet frames. Illustrative systems include a host computer, a disk array, and a network.

In one embodiment, the receiving node processes frames of multiple packets simultaneously and the frame manager generates multiple reassembly tables, each one corresponding to a processed packet. To this end, a context is stored for each processed packet and includes fields used to generate memory entries for non-consecutively received frames of the respective packet.

A method for reordering a plurality of frames of a packet received by a node in non-consecutive order includes the steps of receiving a frame, comparing the sequence count of the received frame to a stored sequence count, and providing an entry in memory if the sequence count of the received frame is not equal to the stored sequence count. The stored sequence count corresponds to the sequence count of a previously received frame incremented by one, or to an initialized value when the received frame is the first frame to be received. The method may further include the steps of maintaining a value representative of a length of data associated with a set of one or more prior consecutively received frames and providing the data length value in the memory entry. A pointer may also be provided in the memory entry to a location in memory at which data associated with the set of prior consecutively received frames are stored. The number of frames received for a given packet are counted and the reordering method is terminated when the number of counted frames is equal to the number of frames in the given packet.

With this arrangement, a port of a receiving node generates a reassembly table which permits packet frames to be reordered without requiring significant memory space and without imposing significant processing delays heretofore associated with frame reordering. These efficiencies are achieved by generating a reassembly table containing only entries indicating non-consecutive breaks of received frames, as opposed to storing entries for each received frame. Since the reassembly table contains fewer entries than received frames, and fewer entries than conventional reordering techniques, the memory requirement is reduced and the time associated with processing the memory entries to reassemble the packet is reduced.

BRIEF DESCRIPTION OF THE DRAWINGS

The above and further advantages of this invention may be better understood by referring to the following description taken in conjunction with the accompanying drawings, in which:

FIG. 5 shows an illustrative format of a reassembly table in accordance with the invention;

FIG. 8 shows an illustrative portion of system memory allocated to store the received frames of FIG. 7B;

FIG. 9 shows a reassembly table containing entries associated with the received frames of FIG. 7B;

FIG. 10 shows an illustrative portion of system memory allocated to store the received frames of FIG. 7C; and FIG. 11 shows a reassembly table containing entries associated with the received frames of FIG. 7C.

DESCRIPTION OF THE PREFERRED EMBODIMENT

Figure 1:
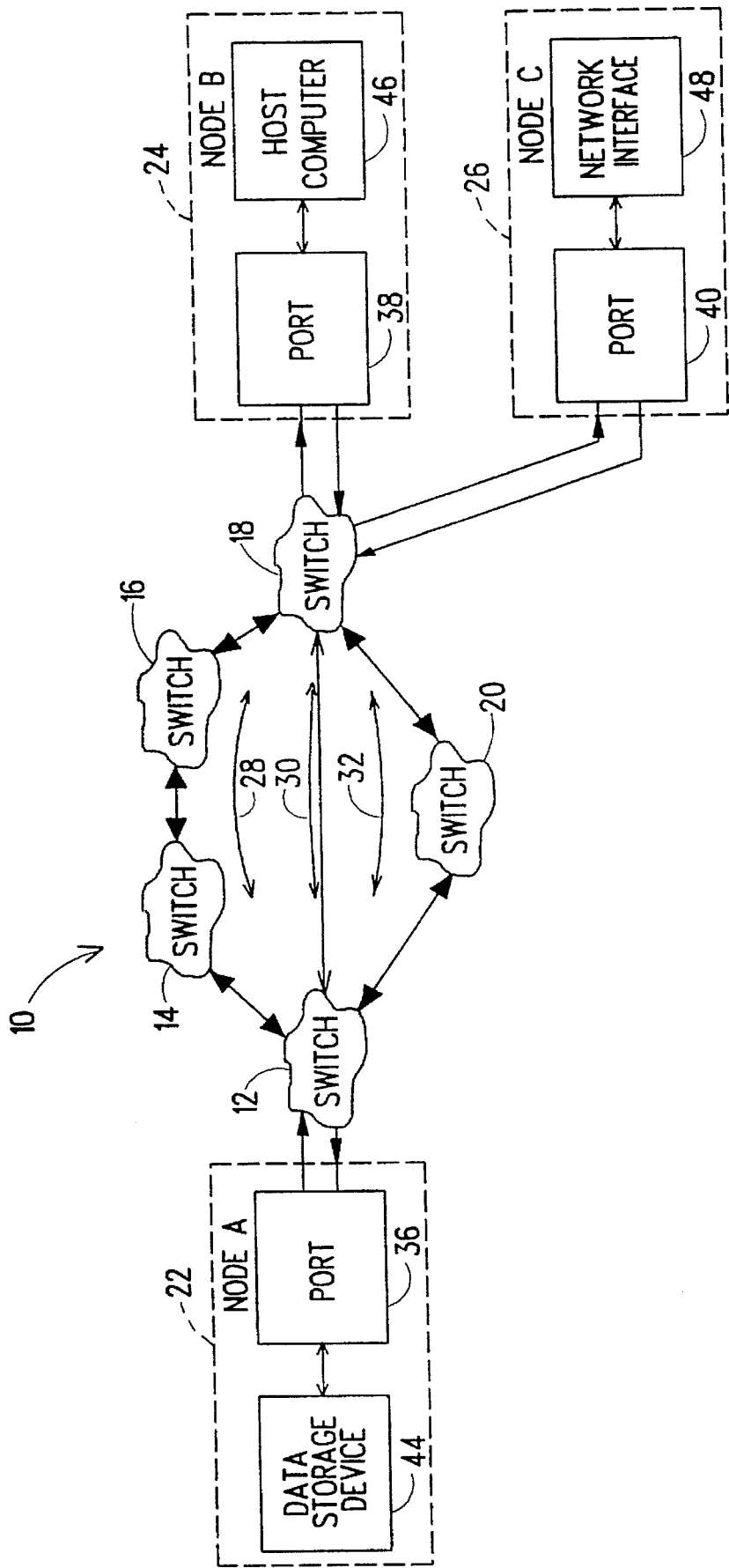
FIG. 1 is a diagram of an illustrative switch fabric interconnecting a plurality of nodes having ports in accordance with the invention.

Referring to FIG. 1, a switch fabric 10, including a plurality of switches 12, 14, 16, 18, and 20, interconnects a plurality of nodes 22, 24, 26. The switches 12–20 are arranged to permit transmission of packets, frame by frame, between the nodes 22–26 over a plurality of paths 28, 30, and 32. More particularly, the switches 12–20, sometimes referred to as routers, selectively direct frames over an optimized path 28–32, such as the path having the least traffic thereon, or the fastest communication link by various known techniques. While a switch fabric 10 is illustrated, the network 10 may comprise any point-to-point interconnection network.

Each of the nodes 22, 24, 26 includes a respective port 36, 38, 40 (referred to sometimes as an N_Port) connected to a switch 12–20 of the fabric 10 for receiving frames from the respective switch and for transmitting frames to the respective switch, as will be discussed. Various types of nodes may be connected to the fabric 10; such as, a data storage node 22, including a data storage device 44 in communication with port 36, a workstation node 24, including a host computer 46 in communication with port 38, and a network node 26 including a network interface 48 in communication with port 40. Such a network interface 48 is further adapted for connection to a network (not shown) having additional nodes connected thereto. It will be appreciated that other types of nodes may be connected to the fabric 10 and that additional nodes (not shown) may be connected to the fabric 10.

The node ports 36–40 include apparatus for reordering frames of a packet received by the respective node in an order other than the order in which the frames are arranged in the packet as transmitted, as will be discussed. In one embodiment, the transmitted packets have a format defined by a Fibre Channel standard (in a specification entitled "FIBRE CHANNEL PHYSICAL AND SIGNALING INTERFACE STANDARD" (FC-PH) Rev. 4.3, X3.230-1994) and shown in FIGS. 2A and 2B for transmission over a Fibre Channel fabric. However, it will be appreciated that the invention may be used with various types of fabrics 10 which permit frames of various formats to be received at a destination node in an order different than the order in which the frames were transmitted.

Figure 2A:
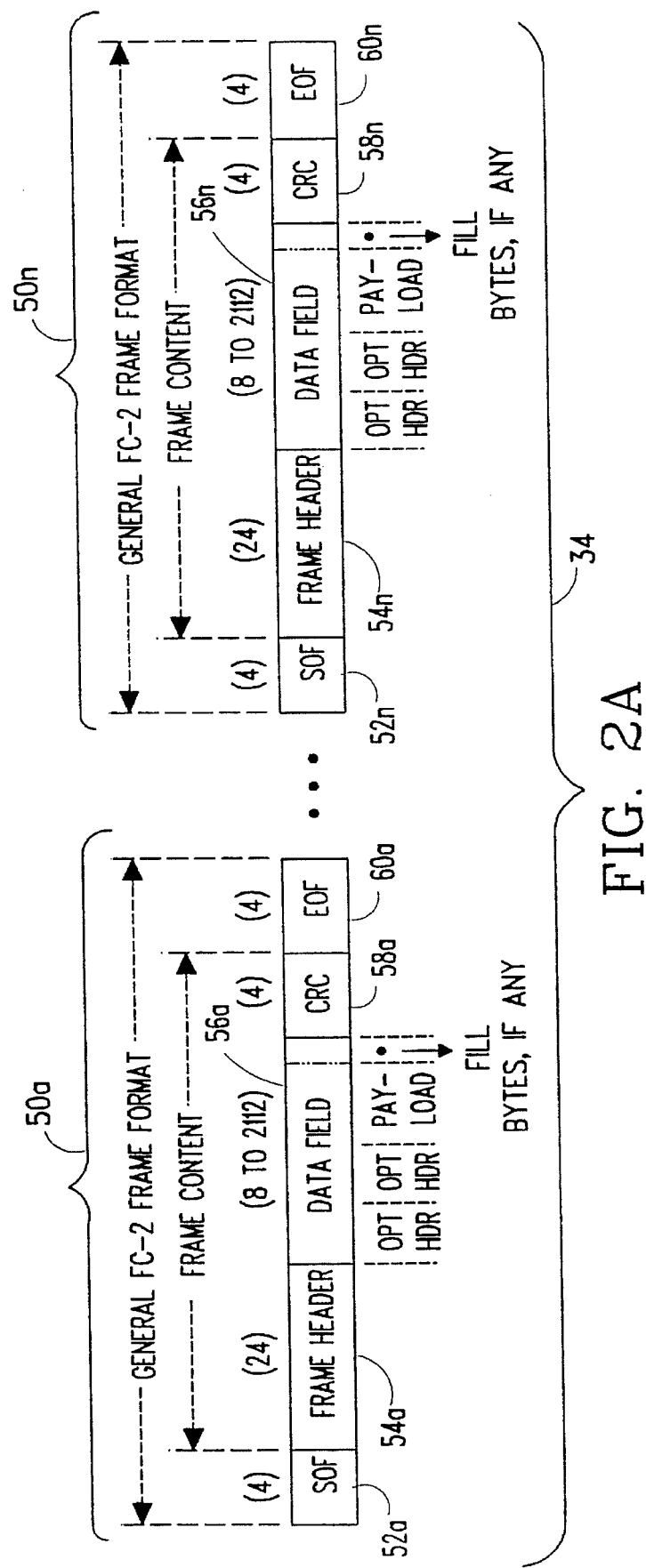
FIG. 2A shows an illustrative frame format for transmission over the switch fabric of FIG. 1.

Referring also to FIG. 2A, an illustrative Fibre Channel packet 34 is shown to include a plurality of frames 50a–n spaced by idle words. Considering the format of exemplary frame 50a, each frame includes a Start-of-Frame (SOF) field 52a having a length of four bytes and indicating the class of service requested for the transmission and whether or not the frame 50a is the first or last in the packet 34 as transmitted. More particularly, a Fibre Channel fabric supports three classes of packet transmission service. In one such class of service, a packet is transmitted over a single path 28–32, thereby precluding frames of the packet from arriving at a receiving node out of order. The remaining two classes of packet transmission service permit individual frames of a packet to be transmitted over different paths 28–32, and differ from one another in that, one such class of service requires that an acknowledgement, indicating that a frame was properly received, be sent by the receiving node to the transmitting node; whereas the other such class of service does not require an acknowledgement. Since frames of a packet can be transmitted over different paths 28–32 in the latter two classes of Fibre Channel service, such frames can arrive at the receiving node in an order different than the order in which the frames were transmitted. That is, while the transmitted packet includes a plurality of sequentially ordered frames (as specified by a sequence count contained within each frame), frames may be received at the receiving node out of this sequential order.

A frame header 54a, twenty-four bytes in length, follows the SOF field 52a, and will be described further below in conjunction with FIG. 2B. A data field 56a having a length of between 0 and 2112 bytes follows the frame header 54a, and, in turn, is followed by a four byte Cyclic Redundancy Check (CRC) field 58a which is used to verify the integrity of the frame 50a. A four byte End-of-Frame (EOF) field 60 follows the CRC field 58a and indicates whether or not the frame 50a is valid or corrupted.

Figure 2B:
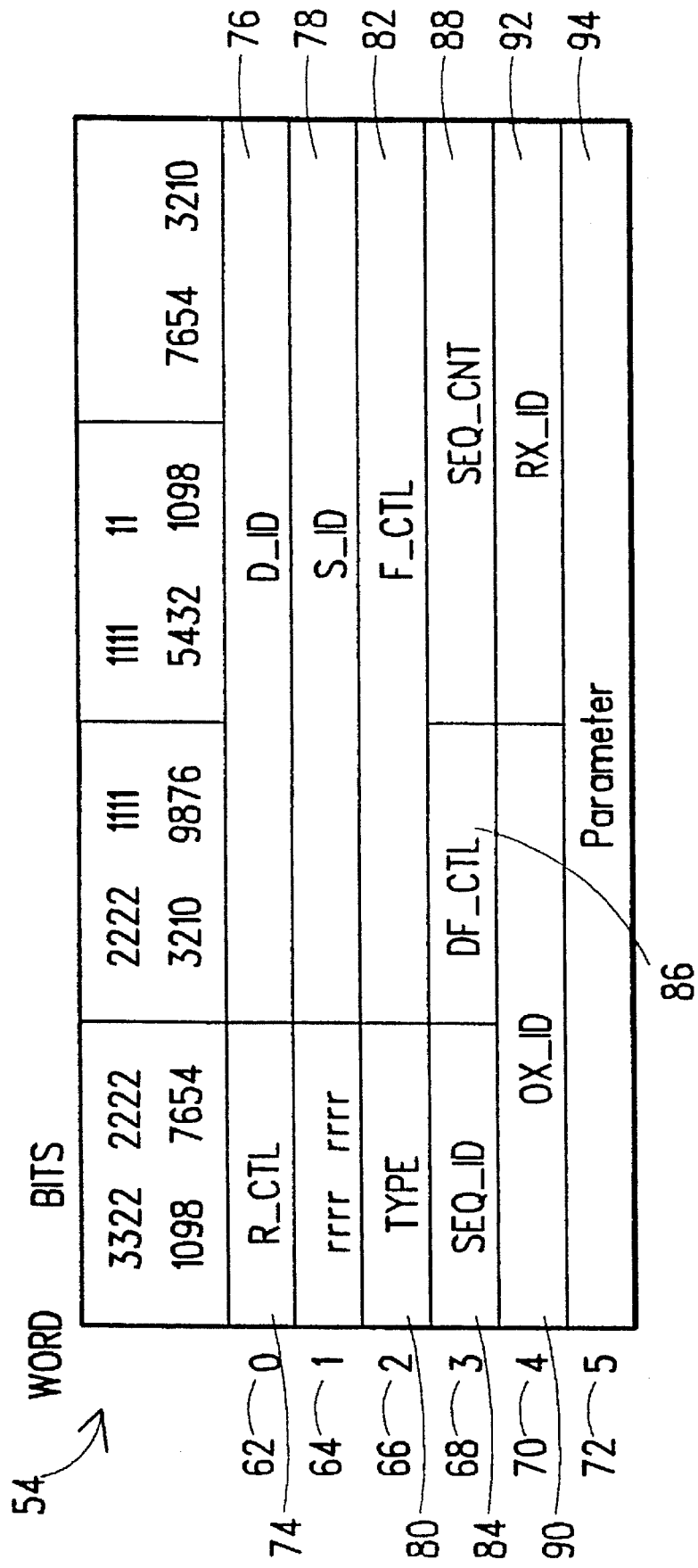
FIG. 2B shows an illustrative format of a header associated with the frames of FIG. 2A.

Referring also to FIG. 2B, the header 54a of exemplary frame 50a is shown to include six words 62, 64, 66, 68, 70, and 72, each thirty-two bits long. The first byte of the first word 62 provides an R_CTL field 74 which defines the frame type as containing either a data field length of zero (i.e., a link control frame) or a data field length of between zero and 2112 bytes (i.e., a data frame). The remaining three bytes of the first word 62 provide a D_ID field 76, identifying the destination node and three bytes of the second word 64 provide an S_ID field 78, identifying the source node. The first byte of the third word 66 provides a TYPE field 80 which, in conjunction with the R_CTL field 74, specifies the protocol of the data associated with the frame. The remaining three bytes of the third word 66 provide an F_CTL field 82 which contains control information regarding the frame, including a one bit flag, at bit nineteen, indicating whether the frame 50a is the last frame of the packet 34 according to the order in which the frames were transmitted. The first byte of the fourth word 68 provides a SEQ_ID field 84 which contains an identifier of the sequence, or packet 34 with which the frame 50a is associated and is followed by a DF_CTL field 86 which specifies the presence of optional header bits at the beginning of the data field 56a. A sixteen bit SEQ_CNT field 88 is also provided in the fourth word 68 and contains a unique identifier of the frame 50a within the packet 34, referred to hereinafter as the sequence count. Note that where the SOF field 52a of a received frame 50 indicates that the frame is the first of the associated packet based on the order in which the frames appear in the packet as transmitted, then the sequence count of the frame provides a lowest sequence count, for use in a manner described below. Similarly, where bit nineteen of the F_CTL field 82 of a received frame indicates that the frame is the last in the respective packet as transmitted, then the sequence count of that frame provides a highest sequence count, for use in a manner described below.

The fifth word 70 of the header 54 includes an OX_ID field 90 and an RX_ID field 92. The OX_ID and RX_ID fields 90, 92 carry an exchange identifier provided by the source node and the destination node, respectively. The sixth word 72 of the frame header 54a contains a parameter field 94, the content of which varies in accordance with whether the frame 50a is a link control frame or a data frame.

Figure 3:
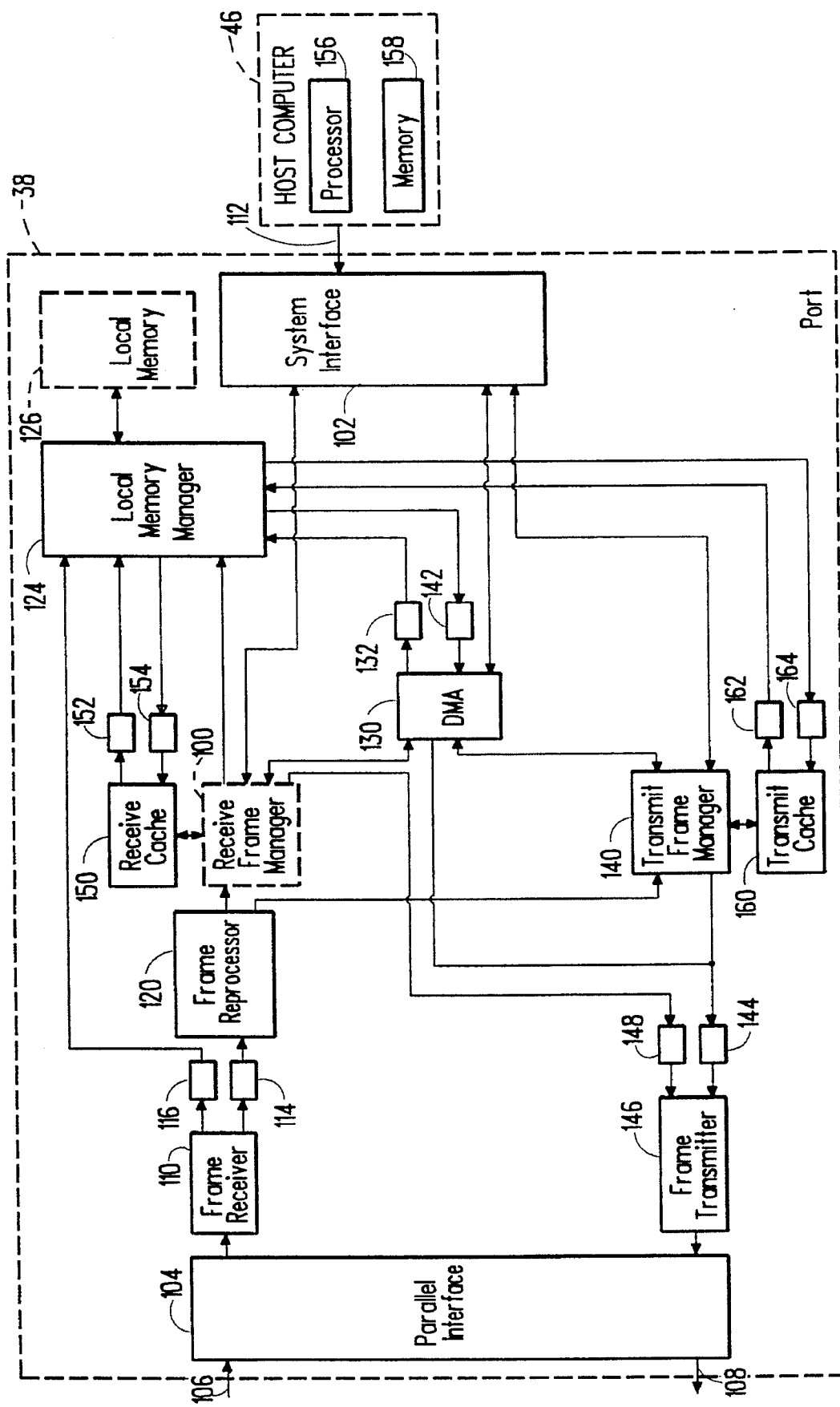
FIG. 3 is a block diagram of an illustrative port of FIG. 1.

Referring to FIG. 3, the ports 36, 38, 40 will be described in conjunction with illustrative port 38 which, along with host computer 46, comprises workstation node 24 (FIG. 1). It will be appreciated however that the ports 36–40 associated with each of the nodes 22–26 have like construction and are adapted for connection to a system, such as a host computer or data storage device, having a processor 156 and a system memory 158.

Port 38 includes a Receive Frame Manager 100 which is responsive to frames 50a–n received by the port 38 for providing an entry in a memory 126 for each such frame 50a–n received out of the sequential order in which the frame 50a–n appears in the transmitted packet 34, as will be described. A list of each such memory entry associated with a given packet 34 provides a reassembly table for use in reordering the frames 50a–n to reassemble the packet 34. More particularly, the system processor 156 accesses the reassembly table, processing the entries contained therein, to reorder the received frames 50a–n.

The port 38 includes a parallel interface 104 connected to a serializer/deserializer (not shown) which is part of the node 24, positioned between the switch 18 and the port 38. The serializer/deserializer converts the serial Fibre Channel signals into digital signals for processing by the port 38. Thus, the parallel interface 104 receives parallel signals via a receipt signal line 106 and transmits parallel signals via a transmit signal line 108. The parallel interface 104 clocks incoming words of frames 50a–n from the receipt line 106 into a Frame receiver 110. As a frame 50a–n (referred to hereinafter generally as frame 50, including an SOF field 52, a header 54, data 56, a CRC field 58 and an EOF field 60) is received, the Frame receiver 110 separates the frame header 54 from the data 56 for further processing. The frame data 56 is transferred to a Frame Data FIFO 116 and the remainder of the frame 50, including the frame header 54, is transferred to a Frame Header FIFO 114. The frame header 54 is processed by a Frame preprocessor 120 connected to the Frame Header FIFO 114; whereas, the frame data 56 is transferred, via a Local Memory Manager 124 to local memory 126 for temporary storage. Note that while the local memory 126 is shown to be contained within the port 38, memory 126 may, alternatively, be located external to the port 38.

The Frame preprocessor 120 checks the CRC field 58 of the received frame 50 to determine whether the frame has been accurately received. In the event that the frame 50 has not been accurately received, the frame 50 is discarded. The Frame preprocessor 120 additionally determines whether the D_ID field 76 of the frame header 54 corresponds to the node 24 associated with the receiving port 38. In the event that the frame destination node specified in header field 76 does not match that of the receiving node 24, a reject frame is routed back to the fabric, for the first two classes of service, or discarded for the third class of service. After processing the frame header 54, the Frame preprocessor 120 transfers the frame header 54 to the Receive Frame Manager 100.

The Receive Frame Manager 100 controls the transfer of received frame data 56 from the local memory 126 to the system memory 158. More particularly, the Receive Frame Manager 100 programs a DMA controller 130 to move data 56 out of the local memory 126 and transfer such data to the system memory 158. The DMA controller 130 achieves this transfer of data 56 via a Write Data FIFO 132, a Read Data FIFO 142, the Local Memory Manager 124, and a System Interface 102. System Interface 102 permits communication between the host computer 46 and the port 38 via a system bus 112, by translating signals internal to the port 38 into signals compatible with the host computer 46.

When the port 38 transmits a frame 50 to the respective switch 18 (FIG. 1), a Transmit Frame Manager 140 programs the DMA controller 130 to read data 56 out of the system memory 158. The data 56 read by the DMA controller 130 is enqueued in a Frame Data FIFO 144 for transmission by a Frame transmitter 146. The Frame transmitter 146 transmits the header 54 followed by the frame data 56. The header 54 may be provided by the Transmit Frame Manager 140 or, alternatively, may be provided directly by the host computer 46. The Frame transmitter 146 is additionally responsive to a Response FIFO 148 which contains entries corresponding to acknowledgements provided by the Receive Frame Manager 100 that a frame was accurately received, as required by the first and second classes of a Fibre Channel service discussed above.

A Receive cache 150 is provided in communication with the Receive Frame Manager 100 and the Local Memory Manager 124 via a local memory Write Data FIFO 152 and a local memory Read Data FIFO 154. The Receive cache 150 stores a context associated with each packet processed by the port 38 for use by the Receive Frame Manager 100 in reordering packet frames, as will be described. Similarly, a transmit cache 160 is provided in communication with the Transmit Frame Manager 140 and the Local Memory Manager 124 via a local memory Write Data FIFO 162 and a local memory Read Data FIFO 164, as shown. The transmit cache 160 functions in a manner similar to the receive cache operation described below, albeit in the transmission of frames as opposed to the receipt of frames.

Figure 4:
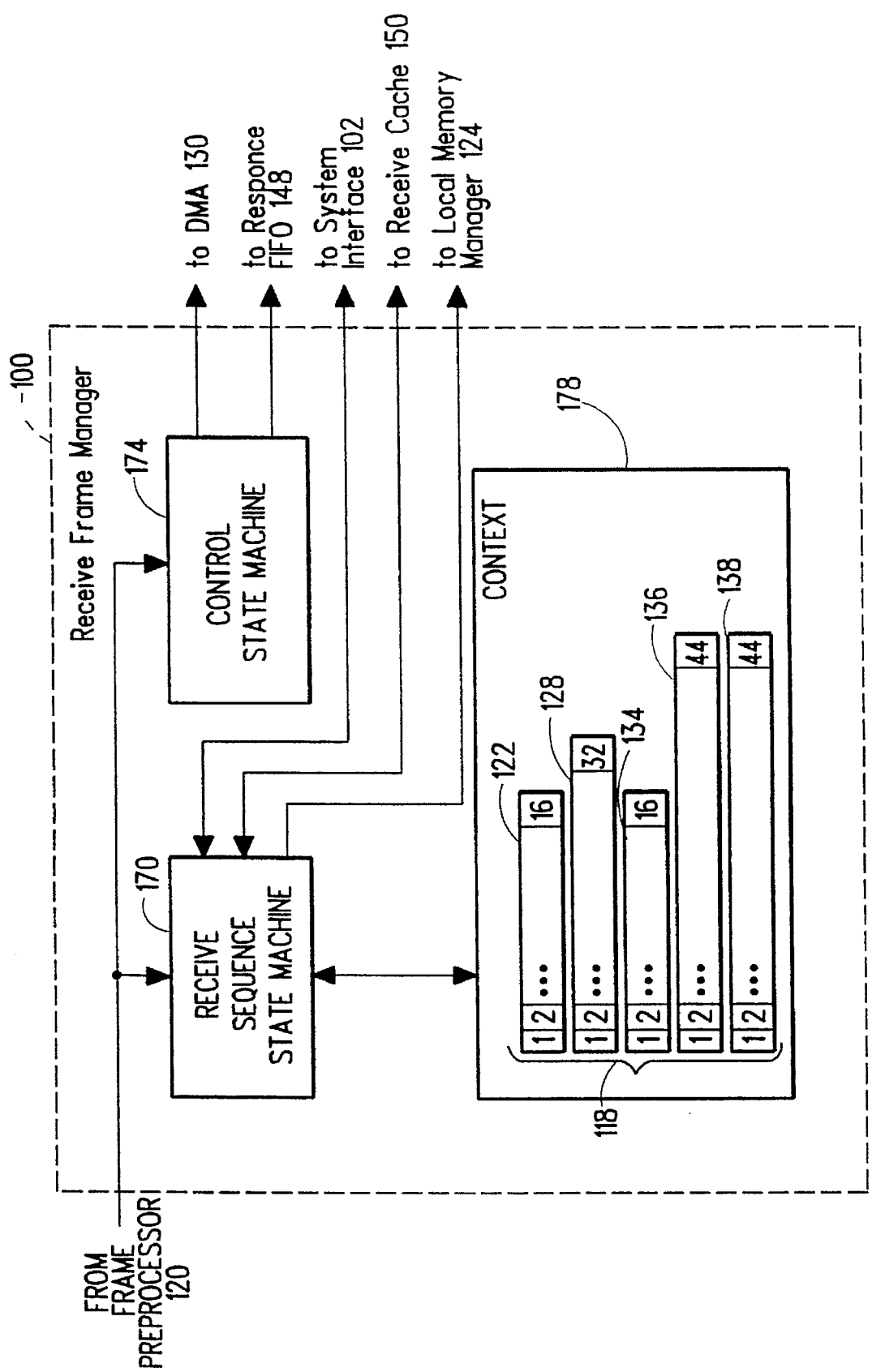
FIG. 4 is a block diagram of the Receive Frame Manager of FIG. 3.

Referring also to FIG. 4, the Receive Frame Manager 100 includes a Receive Sequence state machine 170 and a Control state machine 174, both of which are in communication with the Frame preprocessor 120 (FIG. 3). The Receive Sequence state machine 170 is further in communication with the System Interface 102, the Receive cache 150 and the Local Memory Manager 124, as shown. The Control state machine 174 is connected to the DMA controller 130 and to the Response FIFO 148.

The Receive Frame Manager 100 additionally includes a current context 178, the contents of which are particular to the packet 34 associated with a currently processed frame 50. More particularly, each port 38 is capable of processing multiple packets 34 at any given time. When a frame 50 is received by the port 38, the packet 34 in which it resides is determined and the contents of the current context 178 are loaded with contents associated with that packet 34, as will be described.

The current context 178 includes registers 118 for maintaining information about the respective packet 34. Specifically, the context registers 118 include a Sequence Count register 122 which, in the illustrative embodiment, is sixteen bits long and stores a value equal to the sequence count of a next expected frame. To this end, when a frame 50 is received by the port 38, the Sequence Count register 122 is modified to contain the sequence count of the received frame 50 plus one. A Data Length register 128 is also provided in the context 178 and contains a value corresponding to the length of data associated with a set of one or more prior consecutively received frames. In the illustrative embodiment, the Data Length register 128 is thirty-two bits long. The context registers 118 further include a Frame counter 134 for maintaining a sixteen bit count of the total number of frames 50a–n of a given packet 34 received by the port 38. A forty-four bit Previous Data Pointer register 136 is provided for maintaining a pointer, referred to hereinafter as the PREVIOUS DATA pointer to a location in the system memory 158 beginning at which is stored. Also provided in the context 118 is a CURRENT DATA Pointer register 138 which maintains a pointer, referred to hereinafter as the CURRENT DATA pointer, to a next available location in the system memory 158 for storing incoming frame data 56.

Upon receipt of a frame 50, the Control state machine 174 determines whether the type of service associated with a received frame 50 requires an acknowledgement to be sent to the source node indicating whether the frame was properly received, as specified in the SOF field 52 of the frame 50. If the class of transmission service requires an acknowledgement, the Control state machine 174 generates the acknowledgement and enqueues such acknowledgement in the Response FIFO 148.

As noted above, the Receive Frame Manager 100 programs the DMA controller 130 to read frame data 56 out of the local memory 126 and transfer such data to the system memory 158 via the system bus 112. Specifically, the Control state machine 174 programs the DMA controller 130 to read the data 56 into locations of the system memory 158 starting at the location pointed to by the CURRENT DATA pointer maintained in a CURRENT DATA Pointer register 138.

Once a frame 50 is received and the header 54 transferred to the Receive Frame Manager 100, the Receive Sequence state machine 170 generates a tag associated with the received frame 50 for comparison to contexts stored in the Receive cache 50. More particularly, the tag includes the source identification from the S_ID field 78 of the frame header 54, the sequence identification from the SEQ_ID field 84 of the header 54, and the OX_ID field 90 from the header 54. If the generated tag matches a tag stored in the Receive cache 150, then the contents of the matching context maintained in the cache 150 are loaded into the current context 178 maintained in the Receive Frame Manager 100 and the packet 34 containing the received frame 50 is referred to as a solicited transmission. Alternatively, if the generated tag does not match a context stored in the Receive cache 150, then the Receive Sequence state machine 170 prompts the system processor 156 for initialized contents for the current context 178 and the packet 34 associated with the received frame 50 is referred to as an unsolicited transmission.

Referring to FIG. 5, an illustrative format of a reassembly table 180 maintained in the Local Memory 126 for a packet 34 is shown. Recall that a reassembly table 180 is stored for each processed packet, such as packet 34. The table 180 includes one entry 182a–182n-1 for each frame of the packet 34 received non-consecutively with respect to a previously received frame and a last entry 182n corresponding to the last frame of the packet to be received.

Each table entry 182a–n includes a respective sequence count field 184a–n which is sixteen bits long, a respective data pointer field 186a–n which is forty-four bits long, and a respective data length field 188a–n which is thirty-two bits long. The sequence count field 184a–n contains the sequence count of the last consecutively received frame and is provided by the Sequence Count register 122 of the current context 178. The data pointer field 186a–n contains a pointer to a location in the system memory 158 beginning at which sequential frame data is stored until a received discontinuity and is provided by the Previous Data Pointer register 136 of the current context 178. That is, the DATA POINTER points to the first location at which a set of one or more consecutive frames, received prior to the process, non-consecutively received frame, is stored. The data length field 188a–n contains a value indicating a length of data received by the port 38 since receipt of a last non-consecutively received frame (i.e., the length of data associated with the set of prior, consecutively received frames) and is provided by the Data Length register 128 of the current context 178.

Figure 6A:
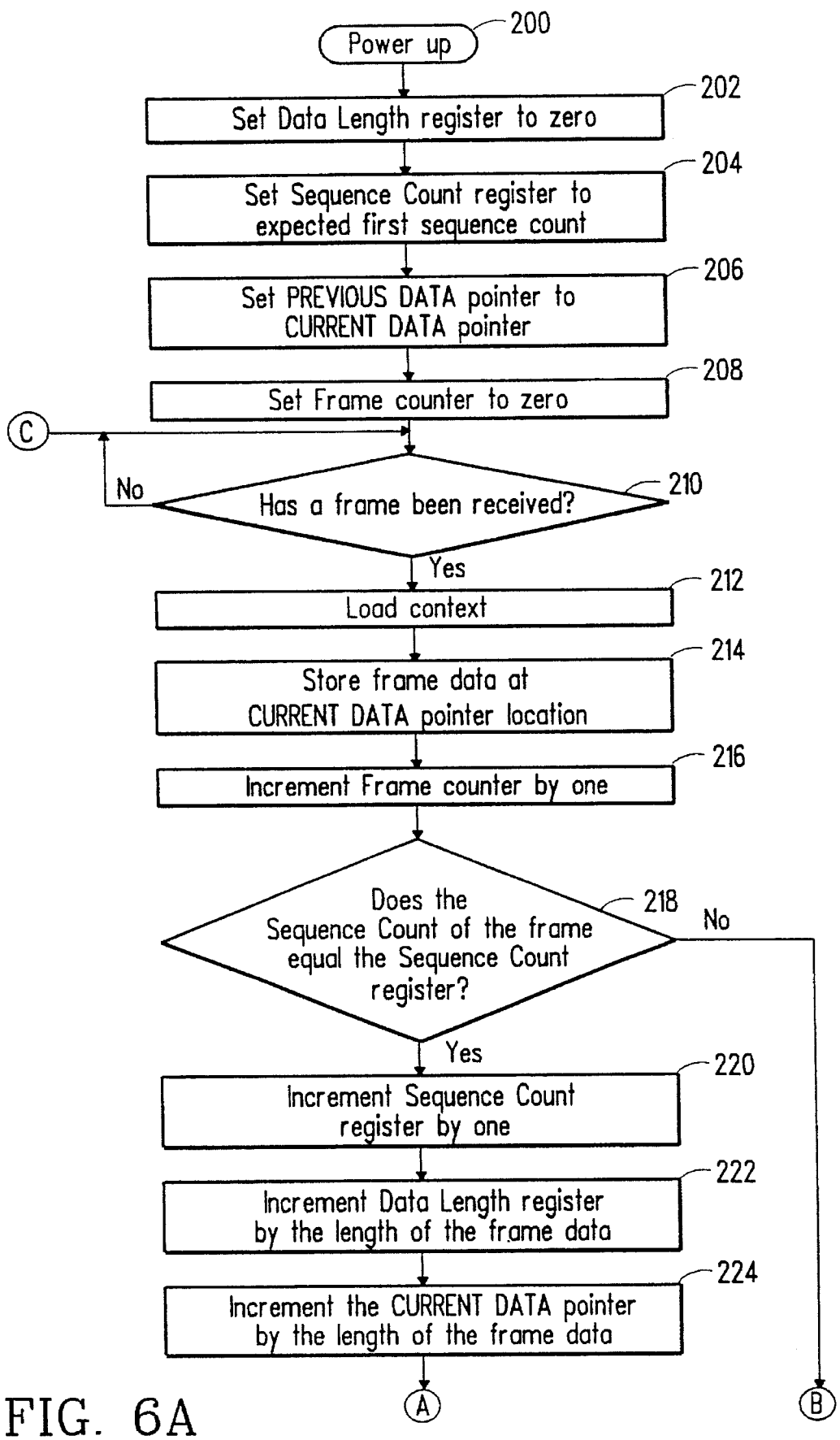
FIGS. 6A and 6B show a flow chart of an illustrative process by which the port of FIG. 3 reorders frames.
Figure 6B:
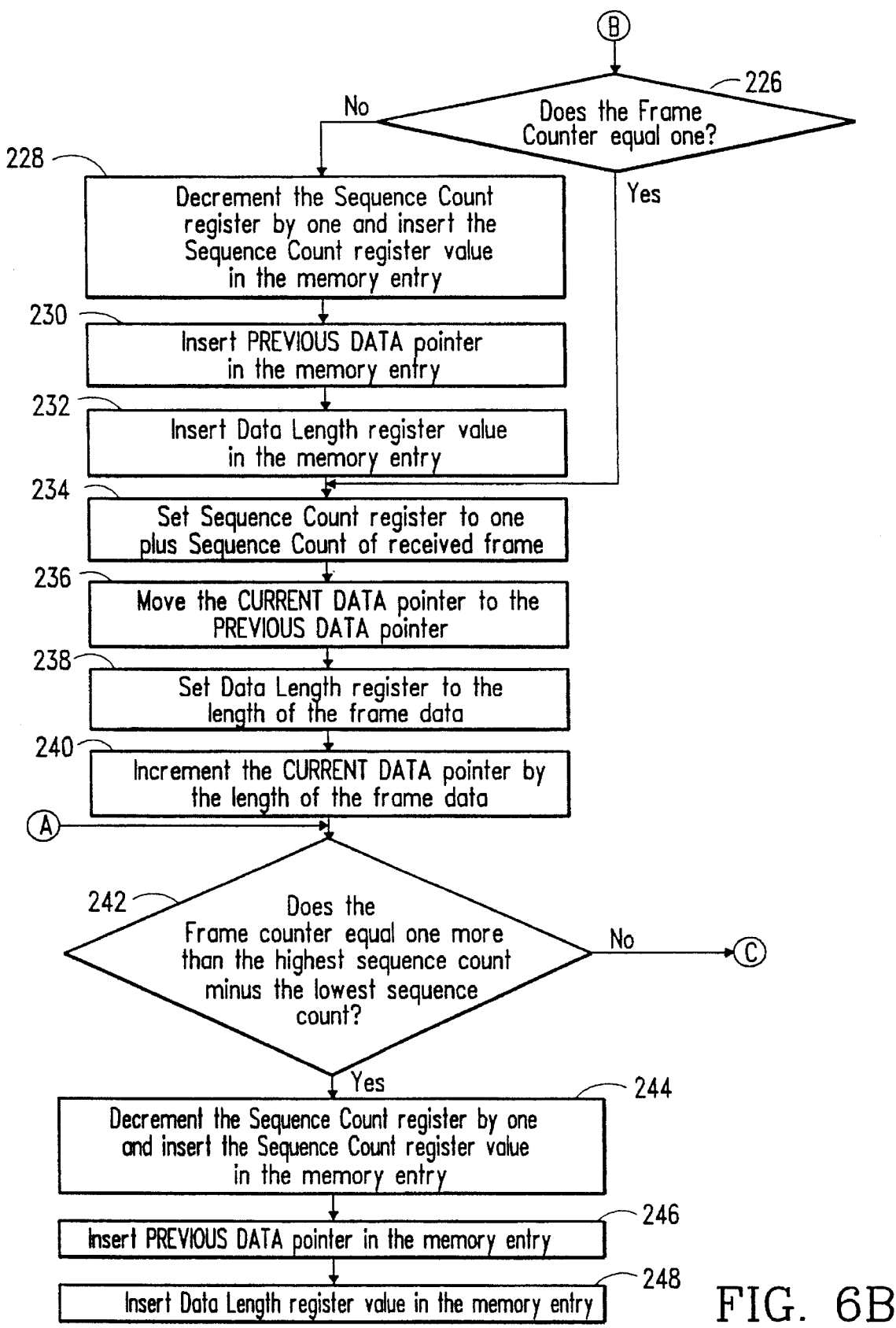

Referring to FIGS. 6A and 6B, flow diagrams show an illustrative process by which frames 50a–n received out of sequential order by the port 38 are reordered. In step 200, the port 38 is powered up or connected to the fabric 10. The port 38 is initialized in steps 202–208 by initializing the contents of the current context registers 118 maintained in the Receive Frame Manager 100. Specifically, the Data Length register 128 is set to zero in step 202, the Sequence Count register 122 is set to the expected first sequence count in step 204, the PREVIOUS DATA pointer in the Data Pointer register 136 is set to the value of the CURRENT DATA pointer in the CURRENT DATA Pointer register 138 in step 206 and the Frame counter 134 is set to zero in step 208. Note that where a particular transmission includes a single packet, the Sequence Count register 122 is initialized to a value of zero. However, where a streamed sequence, including more than one packet is transmitted, the Sequence Count register 122 will be initialized to a value indicating the next sequential sequence count after the highest sequence count of a previously received packet of the streamed sequence.

Having initialized the current context 178, it is determined, in step 210, whether a frame 50a–n has been received by the port 38. Step 210 is repeated until a frame 50a–n is received. When a frame 50a–n, such as illustrative frame 50a, is received, the context 178 of the Receive Frame Manager 100 is loaded (unless the received frame 50a is the first frame of a packet in which case the registers remain in their initialized states provided in steps 202–208). More particularly, in step 212, the frame tag described above is generated by the Receive Sequence state machine 170 and is compared to tags stored in the Receive cache 150. If the generated tag is found to match a stored tag, then the contents of the current context registers 118 are loaded from the Receive cache 150 in accordance with registers associated with the matching tag. Alternatively, if the generated tag does not match a tag stored in the Receive cache 150 (i.e., if the received frame 50a is the first frame associated with a packet to be received), then the system processor 156 initializes the current context registers 118, in the same manner as the context 178 is initialized after system power up in steps 202–208.

Thereafter, in step 214, the frame data such as data 56a of received frame 50a, is stored in the system memory 158 at the location pointed to by the CURRENT DATA pointer (i.e., after having been temporarily stored in local memory 126). In step 216, the Frame counter 134 is incremented by one. In step 218, it is determined whether the sequence count of the received frame 50a is equal to the sequence count stored in the Sequence Count register 122. If the two sequence counts are equal, then the received frame 50a is consecutive with respect to the previously received frame (or, is the first frame of a packet to be received and is also the first sequential frame of the packet as transmitted) and no entry is made in the reassembly table 180. Alternatively, if it is determined in step 218 that the sequence count of the received frame 50a is not equal to the sequence count stored in the Sequence Count register 122, then the received frame 50a is non-consecutive with respect to a previously received frame (or is the first frame of a packet to be received but is not the first sequential frame of the packet as transmitted) and an entry is made in the reassembly table 180.

Consider first the case where the sequence count of the received frame 50a is equal to the value in the Sequence Count register 122. In this case, no entry is made into memory and the current context registers 118 are reset in preparation for receipt of a subsequent frame in steps 220, 222, and 224. Specifically, the value in the Sequence Count register 122 is incremented by one in step 220, in preparation for comparison to the sequence count of a subsequently received frame. The value in the Data Length register 128 is incremented by the length of the received frame data 56a in step 222. In step 224, the CURRENT DATA pointer in register 138 is incremented by the length of the received frame data 56a, to indicate that the next available memory location is after the stored data 56a.

In the case where the sequence count of the received frame 50a is not equal to the value in the Sequence Count register 122, then step 226 is performed (FIG. 6B) after step 218, in which it is determined whether the Frame counter 134 is at a value of one. If it is determined that the Frame counter 134 is at one, thereby indicating that the received frame 50a is the first frame of the packet 34 received, then step 234 is next performed and no entry is made into the reassembly table 180. If, on the other hand, it is determined in step 226 that the value of the Frame counter 134 is not equal to one, then the non-consecutively received frame is not the first frame received and steps 228, 230 and 232 are performed in which an entry is made in the reassembly table 180. Specifically, in step 228, the Sequence Count register value is decremented by one and the decremented value is inserted into the sequence count field 184a of the first entry 182a in the reassembly table 180. In step 230, the PREVIOUS DATA pointer from the Previous Data Pointer register 136 is inserted into the data pointer field 186a of the memory entry 182a and in step 232, the value stored in the Data Length register 128 is inserted into the data length field 188a of the memory entry 182a.

Thereafter, the current context registers 118 are reset in preparation for the next received frame 50a–n in steps 234, 236, 238, and 240. Note that where the Frame counter 134 is determined to be equal to one in step 226, step 234 is performed directly after step 226. In step 234, the Sequence Count register 122 is set to a value of one plus the sequence count of the received frame, for comparison to the sequence count of a subsequently received frame 50a–n. In step 236, the PREVIOUS DATA pointer is made to point to the same location as the CURRENT DATA pointer. In step 238, the Data Length register 128 is set to by the length of data 56a associated with the received frame 50a. And, in step 240, the CURRENT DATA pointer is incremented by the length of the received frame data 56a, to point to the next available memory location for storing incoming frame data.

In step 242, it is determined whether all of the frames 50a–n of the packet 34 have been received. Specifically, the value in the Frame counter 134 is compared to one more than the difference between the highest sequence count and the lowest sequence count, as determined from bit nineteen of the F_CTL field 82 of the header of the received frame and the SOF field 52 of the received frame, respectively. A Frame counter value equal to one more than the highest sequence count minus the lowest sequence count indicates that all of the frames 50a–n of the packet 34 have been received. The above-described process is repeated, starting at step 210, until the last frame associated with the packet 34 is received.

Once the Frame counter 134 indicates that all of the frames 50a–n for a particular packet 34 have been received, the last entry 182n is made in the reassembly table 180 in steps 244, 246, and 248. Specifically, in step 244, the Sequence Count register 122 is decremented by one and the decremented value is inserted into the sequence count field 184n of the last entry 182n. In step 246, the PREVIOUS DATA pointer from the Data Pointer register 136 is inserted into the data pointer field 186n of the last memory entry 182n and, in step 248, the value stored in the Data Length register 128 is inserted into the data length field 188n of the last memory entry 182n.

Figure 7A:
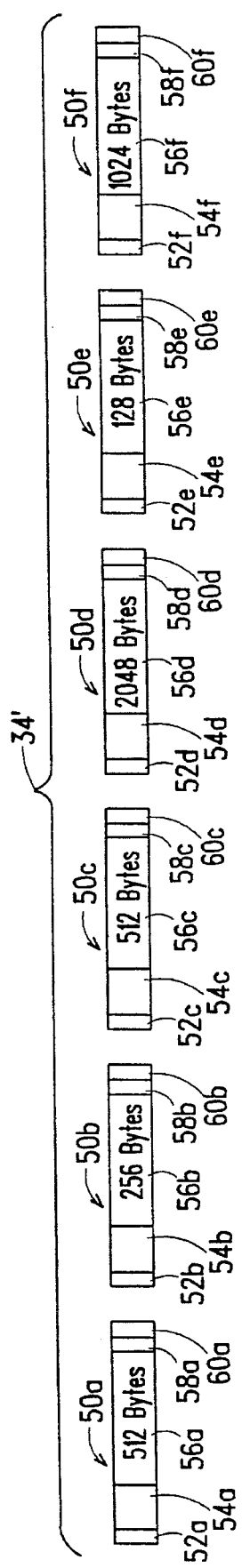
FIG. 7A shows an illustrative packet transmitted by a transmitting node of FIG. 1.
Figure 7B:
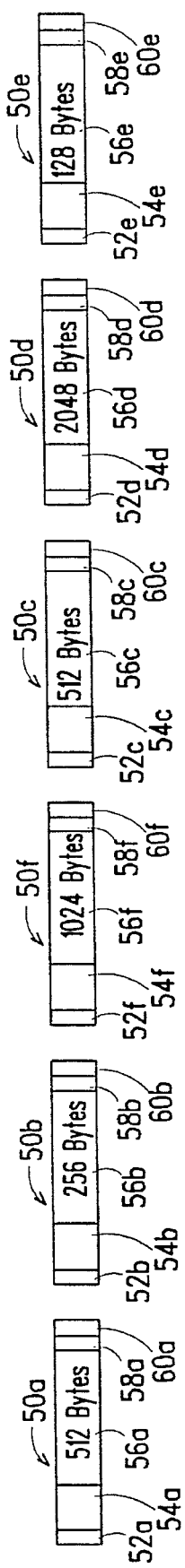
FIG. 7B shows one illustrative order in which the frames of the packet of FIG. 7A are received by a receiving node.

In order to illustrate the operation of the port 38 in reordering non-consecutive frames, consider two cases where a packet 34', including six frames 50a–50f having respective sequence counts of 0–5, consecutively, and transmitted in the order shown in FIG. 7A, is received by the port 38. Specifically, consider first the case where the frames 50a–50f are received by the port 38 in the following order: frame 50a, frame 50b, frame 50f, frame 50c, frame 50d and frame 50e, as shown in FIG. 7B. The frames 50a–50f have respective data fields 56a–56f with lengths as indicated in the data fields 56a–56f in FIGS. 7A–C. FIG. 8 shows a portion of the system memory 158 at which the data 56a–56f, associated with the frames 50a–50f, respectively, of FIG. 7B are stored. FIG. 9 shows the reassembly table 180' generated by the Receive Frame Manager 100 and stored in local memory 126 in response to receipt of frames 50a–50f in the order illustrated in FIG. 7B.

When the first frame 50a is received, the registers 118 of the current context 178 are in their initialized states (i.e., because the tag generated in response to receipt of frame 50a was found not to match a tag in the Receive cache 150 so the system processor 156 initialized the current context 178 in step 212). Thus, the Sequence Count register 122 is at a value of zero, the Data Length register 128 is at a value of zero and the Frame counter 134 is at a value of zero. Also, the PREVIOUS DATA pointer points to the location 250 (FIG. 8) to which the CURRENT DATA pointer is initialized by the system processor 156.

The data 56a associated with the received frame 50a is stored in system memory 158, starting at the location 250 pointed to by the CURRENT DATA pointer in step 214. In step 216, the Frame counter 134 is incremented by one, to a value of one. When the sequence count of the received frame 50a (i.e., zero) is compared to the sequence count of zero contained in the register 122 in step 218, it is determined that the two sequence counts are equal, thereby indicating that the frame 50a has been received in the same order in which it was transmitted.

In accordance with the process discussed above, there will not be an entry made in the reassembly table 180' in response to receipt of frame 50a since the frame 50a is received in the same order in which it appears in the transmitted frame 34, namely first. Stated differently, frame 50a is the first expected frame. The registers 118 of the context 178 are incremented in steps 220–224. Specifically, in step 220, the Sequence Count register 122 is incremented by one, to a value of one. In step 222, the Data Length register 128 is incremented by the length of the data 56a associated with the received frame 50a, to a value of 512 bytes. And, in step 224, the CURRENT DATA pointer is incremented by the length of the data 56a associated with the received frame 50a (i.e., in the illustrative example, by 512 bytes, to memory location 252).

Thereafter, in step 242 (FIG. 6B), it is determined that the Frame counter 134, now at a value of one, is not equal to one more than the difference between the highest sequence count of five and the lowest sequence count of zero. Thus, since the received frame 50a is not the last frame of the packet 34', the process is repeated, starting at step 210.

When the second frame 50b associated with the packet 34' is received, generation of the tag associated with the incoming frame 50b and comparison of the generated tag to the current context 178 in the Receive Frame Manager 100 in step 212 reveals that the subsequently received frame 50b is associated with the same packet 34' as the previously received frame 50a. Thus, the contents of the context 178 are maintained for further processing in conjunction with frame 50b. The data 56b associated with the frame 50b is stored in the system memory 158 starting at the memory location 252 pointed to by the CURRENT DATA pointer in register 138 in step 214. In step 216, the Frame counter 134 is incremented by one, to indicate that two frames 50a and 50b of the packet 34' have been received.

The determination of process step 218 reveals that the sequence count of one, of the received frame 50b equals the current value of one in the Sequence Count register 122. Thus, no entry is made in the reassembly table 180' in response to receipt of the frame 50b since frame 50b is consecutive with respect to the previously received frame 50a. Thereafter, the registers 118 are incremented in steps 220–224. Specifically, in step 220, the Sequence Count register 122 is incremented by one to a value of two. In step 222, the Data Length register 128 is incremented by the length of the received frame data 56b. In the illustrative case, the Data Length register 128 is incremented by 256 bytes, to 768 bytes. In step 224, the CURRENT DATA pointer is also incremented by the length of the received frame data 56b, to point to memory location 254 in FIG. 8.

In step 242, it is determined that the received frame 50b is not the last frame of the packet 34' to be received, thereby causing the process to be repeated a third time, starting at step 210. Since the next frame received 50f is non-consecutive with respect to the previously received frame 50b, it is determined in step 218 that the sequence count of five, associated with the received frame 50f, is not equal to the sequence count value of two currently stored in the register 122. Thus, a first entry 182a' will be provided in the reassembly table 180' in response to non-consecutive frame 50f as follows.

Since the value in the Frame counter 134 is not equal to one (as determined in step 226), the Sequence Count register 122 is decremented by one, to a value of one and this decremented value of one is inserted into the sequence count field 184a' of the first entry 182a' of the table 180' in step 228, as shown in FIG. 9. The data pointer field 186a' of the entry 182a' contains the PREVIOUS DATA pointer from register 136 which still points to location 250 and the data length field 188a' of the entry 182a' contains the value from the Data Length register 128, of 768 bytes.

Once the first memory entry 182a' is completed, the registers 118 are readied for receipt of a subsequent frame, in steps 234–240, by setting the Sequence Count register 122 to one plus the sequence count of the received frame (i.e., to a value of six), by moving the CURRENT DATA pointer to the PREVIOUS DATA pointer location 254, by setting the Data Length register 128 to the length of data 56f of associated with the third received frame 50f of 1024 bytes, and by incrementing the CURRENT DATA pointer maintained in register 138 by 1024 bytes (i.e., the length of the data 56f associated with the frame 50f) to point to location 256 at byte 1792.

Frame 50c is the fourth frame to be received. Since the Sequence Count register 122 is now at a value of six, it is determined that the sequence count of two of the received frame 50c is not equal to the value in the Sequence Count register 122. Thus, in response to receipt of frame 50c, there will be a second entry 182b' provided in the reassembly table 180'. In step 226, it is determined that the Frame counter 134, now at a value of four, is not equal to one. Thus, the Sequence Count register 122 is decremented by one, to a value of five, and this value of five is inserted into the sequence count field 184b' of the second entry 182b' in the reassembly table 180'. In step 230, the PREVIOUS DATA pointer, pointing to location 254, is inserted into the data pointer field 186b' of the second entry 182b' in the reassembly table 180'. The second table entry 182b' is completed in step 232 by the insertion of the value in the Data Length register 128, in this case, a value of 1024 bytes, as shown in FIG. 9.

Steps 234–240 are next performed in which the registers 118 are again reset in preparation for receipt of a subsequent frame. Specifically, the Sequence Count register 122 is set to a value of one more than the sequence count of the received frame, or in this case a value of three. In step 236, the PREVIOUS DATA pointer is modified to point to memory location 256 to which the CURRENT DATA pointer currently points. In step 238, the Data Length register 128 is set to the length of the data 56c associated with the received frame 50c. And, in step 240, the CURRENT DATA pointer is incremented by the length of the received data 50c, here 512 bytes, to point to memory location 258. Thereafter, in step 242, it is determined that the received frame 50c is not the last frame associated with the packet 34', causing the process to be repeated again, starting at step 210.

When the fifth frame 50d is received, the Frame counter 134 is incremented by one, to a value of five. It is determined, in step 218 that frame 50d is consecutive with respect to previously received frame 50c. Thus, no entry is made in table 180' in response to frame 50c and the registers 118 are reset in steps 220–224. Specifically, the Sequence Count register 122 is incremented by one in step 220 to a value of four and the Data Length register 128 is incremented by length of data 56d associated with the received frame 50d (i.e., by 2048 bytes) to a value of 2560 bytes in step 222. Also, the CURRENT DATA pointer is incremented by the length of the data 56d to a point to memory location 260 in step 224.

Finally, frame 50e is received and processed in the same manner as the preceding frame 50d, since frame 50e is consecutive with respect to the previously received frame 50d. Thus, since the sequence count of four of the received frame 50e is equal to the current value of four in the Sequence Count register 122, no entry is made in the reassembly table 180' in response to frame 50d. The Sequence Count register 122 is incremented by one, to a value of five, in step 220 and the Data Length register 128 is incremented by the length of data 56e associated with the received frame 50e in step 222, to a value of 2688 bytes. Also, in step 224, the CURRENT DATA pointer is incremented by 128 bytes to point to memory location 262.

Thereafter, in step 242, it is determined that the Frame counter 134 is at a value equal to one more than the highest sequence count minus the lowest sequence count, or six, the total number of frames in the illustrative packet 34'. In response to this determination, Sequence Count register 122 is decremented by one, to a value of five, and this value is inserted into the sequence count field 184c' of the last memory entry 182c' in step 244. Additionally, the PREVIOUS DATA pointer location 256 is inserted into the last memory entry 182c' in step 246 and the Data Length register value of 2688 is inserted into memory entry 182c' in step 248.

With this arrangement, a reassembly table 180' has been generated including an entry for each non-consecutively received frame 50f and 50c, and for the last frame 50e of the packet 34' to be received. The table 180' is now ready for processing by the system processor 156 to reorder the frames 50a–50f so as to reassemble the packet 34'. Specifically, the system processor 156 processes each of the entries 182a'–182c' in ascending order of sequence count. Thus, entry 182a' is processed first, followed by entry 182c' and finally by entry 182b'.

Processing of an entry is achieved by accessing memory locations starting at the pointer contained in the pointer field for the entry and specifically, accessing a number of memory locations specified by the data length field of the entry. Thus, the packet 34' is reassembled by processing entry 182a' by reading 768 bytes of memory starting at location 250, followed by reading 2688 bytes of memory starting at location 256 and finally, by reading 1024 bytes of memory starting at location 254. In this way, the reassembled packet 34' is provided.

Figure 7C:
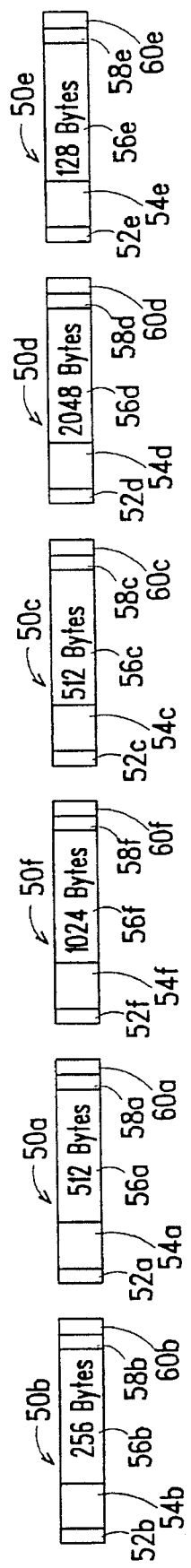
FIG. 7C shows another illustrative order in which the frames of the packet of FIG. 7A are received by a receiving node.

Referring to FIG. 7C, consider the case where the frames 50a–50f of the transmitted packet 34' (FIG. 7A) are received by the port 38 in the following order: frame 50b, frame 50a, frame 50f, frame 50c, frame 50d and frame 50e, as shown in FIG. 7C. This example illustrates the case where the first frame of a packet to be received is not the first frame of the packet as transmitted (i.e., where the received frame is not the expected first frame). FIG. 10 shows a portion of the system memory 158 at which the data 56a–56f, associated with frames 50a–50f, respectively, are stored and FIG. 11 shows the reassembly table 180" generated by the Receive Frame Manager 100 and stored in local memory 126 in response to receipt of frames 50a–50f in the order illustrated in FIG. 7C.

Prior to receipt of frame 50b, the registers 118 of the context 178 are initialized in steps 202–208, as described above. Thus, the Sequence Count register 122 is at a value of zero (assuming that the frame having a sequence count of zero is the first expected frame), the Data Length register 128 is at a value of zero, the PREVIOUS DATA pointer register 136 points to the same memory location to which the CURRENT DATA pointer is initialized. When frame 50b is received, the frame data 56b is stored at the initialized memory location 270 pointed to by the CURRENT DATA pointer and the Frame counter 134 is incremented by one, to a value of one. In step 218, it is determined that the sequence count of the received frame 50b (i.e., a sequence count of one) is not equal to the value of zero stored in the Sequence Count register 122. Thus, process step 226 is next performed in which it is determined that the Frame counter 134 is at a value of one. This determination corresponds to the special case where the first frame to be received is not the expected first frame (i.e., is not the first frame of the packet 34' as transmitted). In this case, no entry is made in the memory table 180" for this first, non-consecutively received frame 50B. Rather, after step 226, steps 243–240 are performed, in which the registers 118 are reset in preparation for receipt of a subsequent frame.

Specifically, in step 234, the Sequence Count register 122 is set to a value of one greater than the sequence count of the received frame, or in this case to a value of two. In step 236, the CURRENT DATA pointer is moved to the PREVIOUS DATA pointer location 270 and in step 238, the Data Length register 128 is set to the length of the received frame data 56b (i.e., to 256 bytes). In step 240, the CURRENT DATA pointer is incremented by the length of the received frame data 56c, to memory location 272. Thereafter, in step 242, it is determined that the Frame counter value of one is not equal to one more than the difference between the highest sequence count and the lowest sequence count, thereby indicating that the last frame of the packet has not been received. Thus, the process is repeated, starting at step 210.

Once the next frame 50a is received, it is determined that the tag associated with the received frame 50a matches the tag associated with previously processed frame 50b. Thus, in step 212, the contents of the current context 178 are maintained for processing frame 50a. In step 214, the data 56a, associated with frame 50a, is stored starting at the memory location 272 pointed to by the CURRENT DATA pointer. In step 216, the Frame counter 134 is incremented to a value of two. Thereafter, in step 218, it is determined that the sequence count of zero of the received frame 50a is not equal to the sequence count value of two stored in the Sequence Count register 122. Thus, an entry 182a" will be made in the memory table 180" in response to receipt of frame 50a.

In step 226, it is determined that the Frame counter 134 is not equal to one, causing steps 228–232 to be performed, in which the first entry 182a" is made in the memory table 180". Specifically, in step 228, the Sequence Count register 122 is decremented by one, to a value of one, and that value is inserted into the first entry 182a" in table 180". In step 230, the PREVIOUS DATA pointer pointing to memory location 270 is inserted into the entry 182a" and in step 232, the value of 256 bytes stored in the Data Length register 128 is inserted into the entry 182a".

In steps 234–240, again, the registers 118 are reset for receipt of the next frame. Step 234 causes the Sequence Count register 122 to be set to a value of one greater than the sequence count of the received frame, or to a value of one. The PREVIOUS DATA pointer is made to point to memory location 272 in step 236 and the Data Length register 128 is set to 512 bytes, the length of the data 56a associated with frame 50a. In step 240, the CURRENT DATA pointer is incremented by 512 bytes, to point to memory location 274. Since received frame 50a is not the sixth, and last frame of the packet to be received, the process is repeated.

Thereafter, frame 50f is received and the data 56f associated with the received frame is stored in memory starting at location 274, to which the CURRENT DATA pointer currently points. The Frame counter 134 is incremented to a value of three in step 216 and, in step 218, it is determined that the sequence count of five of the received frame 50f is not equal to the sequence count of one in the register 122. Thus, since frame 50f is received non-consecutively with respect to the previously received frame 50a, a second entry 182b" is made in the table 180" in accordance with steps 228–234.

In seep 228, the Sequence Count register 122 is decremented by one, to a value of zero and this decremented value is inserted into the second entry 182b" as shown in FIG. 11. Also, the PREVIOUS DATA pointer location 272 is inserted into the second entry 182b" in step 230 and the value of 512 bytes in the Data Length register 128 is inserted into the second entry 182b" in step 232. Since the subsequently received frames 50c, 50d, and 50e are received in the same order as described above in conjunction with the example of FIGS. 7B, 8, and 9, the process by which entries 182c" and 182d" are made into table 180" is identical to the process discussed above in which entries 182b' and 182c' are made into the table 180'.

The reassembly table 180" shown in FIG. 11 is processed in the same manner as table 180' discussed above. Specifically, the system processor 156 processes entries 182a"–182d" starting with the entry having the lowest sequence count. Thus, entry 182b" is processed first followed by entry 182a", entry 182d" and finally 182c". The packet 34' of FIG. 7A is reassembled by reading 512 bytes from memory starting at location 272, followed by 256 bytes starting at memory location 270, 2688 bytes starting at memory location 276 and finally, 1024 bytes starting a memory location 274.

It will be appreciated that, in the case where a packet 34 is received in the same order as it is transmitted, the reassembly table 180 for that packet 34 will contain only a single entry, corresponding to the last frame of the packet 34 to be received. Such an entry includes the sequence count of the last received frame, a pointer to the location in memory 158 beginning at which the first frame of the packet 34 is stored, and a data length value indicating the cumulative length of data of each of the frames 50a–n of the packet 34.

Having described the preferred embodiments, those skilled in the art will realize that many variations are possible which will still be within the scope and spirit of the claimed invention.

For example, it will be appreciated that various options exist for implementing the port 38, such as by integrating the port components on an ASIC. It will also be appreciated that the order of the process steps of FIGS. 6A and 6B may be varied somewhat without departing from the spirit of the invention.

It will also be appreciated that, although the reassembly tables are described hereinabove as being stored in local memory 126 various memory configurations can be used without departing from the spirit of the invention. For example, the reassembly tables may be stored in the system memory 158. Furthermore, the entries in a reassembly table need not be stored in a contiguous block of memory locations.

Therefore, it is the intention to limit the invention only as indicated by the scope of the claims.

We claim:

1. Apparatus for reordering a plurality of frames of a packet transmitted to said apparatus and received by said apparatus out of order, comprising:
   a frame manager responsive to said plurality of frames for providing a memory entry identifying that one of said plurality of frames is received by said apparatus nonconsecutively with respect to a previously received one of said plurality of frames, said previously received one of said plurality of frames defining an end of a set comprising at least one consecutively received frame; and
   a memory for storing a plurality of said memory entries associated with said packet.

2. The apparatus recited in claim 1 wherein said memory entry includes a sequence count identifying said previously received one of said plurality of frames, a pointer to a location in said memory at which data associated with said set comprising at least one consecutively received frame is stored, and a value representing a length of data associated with said set comprising at least one consecutively received frame.

3. The apparatus recited in claim 2 further comprising a processor for processing said plurality of memory entries in ascending order of sequence count to reorder said plurality of frames of said packet.

4. The apparatus recited in claim 1 wherein said frame manager provides a memory entry when a last one of said plurality of frames of said packet is received.

5. The apparatus recited in claim 1 wherein said frame manager comprises a context including a sequence count register containing a sequence count of said previously received one of said plurality of frames, a data length register containing a value representing a length of data associated with said set comprising at least one consecutively received frame and a frame counter for maintaining a count of said plurality of frames received by said apparatus.

6. A receive node for reordering a plurality of frames of a packet transmitted over a switch fabric comprising a plurality of switches interconnecting a transmit node and said receive node, said receive node comprising:
   a port for receiving said plurality of frames and for providing a memory entry identifying that one of said plurality of frames is received out of order with respect to a previously received one of said plurality of frames, said previously received one of said plurality of frames defining an end of a set comprising at least one consecutively received frame;
   a memory for storing a plurality of said memory entries associated with said packet to provide a reassembly table; and
   a system in communication with said port and said memory, said system comprising a processor for processing said entries of said reassembly table to reorder said plurality of frames of said packet.

7. The receive node recited in claim 6 wherein said system is one of a host computer, a data storage device and a network.

8. The receive node recited in claim 6 wherein said switch fabric is a fibre channel switch fabric.

9. The receive node recited in claim 6 wherein said memory entry includes a sequence count identifying said previously received one of said plurality of frames, a pointer to a location in said memory at which data associated with said set comprising at least one consecutively received frame is stored, and a value representing a length of data associated with said set comprising at least one consecutively received frame.

10. The receive node recited in claim 6 further comprising a context including a sequence count register containing a sequence count of said previously received one of said plurality of frames, a data length register containing a value representing a length of data associated with said set comprising at least one consecutively received frame, and a frame counter for maintaining a count of said plurality of frames received by said port.

11. The receive node recited in claim 10 wherein said port comprises a frame manager responsive to a header portion of each of said plurality of frames for comparing a sequence count contained in said header with said sequence count contained in said sequence count register of said context.

12. A method of reordering a plurality of frames of a packet transmitted in an initial ordered sequence and received by a node in a sequence other than said initial ordered sequence, comprising the steps of:

receiving said plurality of frames, each received frame having a sequence count associated therewith, said sequence count being indicative of the location of the respective received frame within said initial ordered sequence;

comparing said sequence count of one of said plurality of frames to one plus said sequence count of a previously received one of said plurality of frames defining a last frame of a set of consecutively received frames;

providing an entry in a memory identifying that said sequence count of said one of said plurality of frames is not equal to one plus said sequence count of said previously received one of said plurality of frames; and processing said entry once said plurality of frames of said packet are received to reorder said frames of said packet.

13. The method recited in claim 12 wherein said entry providing step further comprises the step of providing a data length value in said entry representing a length of data associated with said set of consecutively received frames.

14. The method recited in claim 12 wherein said entry providing step further comprises the step of providing a pointer in said entry to a location in said memory at which data associated with said set of consecutively received frames is stored.

15. The method recited in claim 12 further comprising the steps of:

counting said plurality of received frames to provide a frame count; and terminating said comparing and entry providing steps once said frame count equals the number of said plurality of frames of said packet.

16. A switch network comprising:

a fabric including a plurality of switches arranged to permit transmission of a packet including a plurality of frames over at least two paths, wherein each frame of said plurality of frames has a sequence count associated therewith which specifies the position of the respective frame within said packet;

a transmitting node in communication with one of said plurality of switches of said fabric for transmitting said plurality of frames of said packet in a first order with respect to said sequence count associated with each of said plurality of frames; and a receiving node in communication with one of said plurality of switches of said fabric for receiving said plurality of frames of said packet in a second order with respect to said sequence count associated with each of said plurality of frames, said receiving node comprising:

a frame manager responsive to said plurality of frames and providing a memory entry identifying that said sequence count associated with one of said plurality of frames received by said receiving node is nonconsecutive with respect to said sequence count of a previously received one of said plurality of frames defining an end of a set comprising at least one consecutively received frame; and a memory for storing a plurality of said memory entries associated with said packet.

17. The switch network recited in claim 16 wherein one of said receiving node and said transmitting node comprises a data storage device in communication with the other one of said receiving node and said transmitting node through said fabric.

18. The switch network recited in claim 16 wherein said fabric is a fibre channel fabric.

* * * * *